(12) United States Patent
Sanpei et al.

(10) Patent No.: US 6,367,963 B2
(45) Date of Patent: Apr. 9, 2002

(54) FOOD MIXING APPARATUS

(75) Inventors: Keiichi Sanpei, Izumiotsu; Yoshio Matsumoto, Sakai; Sadao Fukushima, Nara, all of (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/771,231

(22) Filed: Jan. 26, 2001

(30) Foreign Application Priority Data

Jan. 27, 2000 (JP) ........................................ 2000-019017

(51) Int. Cl.[7] .................................................. B01F 9/02
(52) U.S. Cl. .......................... 366/233; 366/208; 366/219
(58) Field of Search ................................. 366/233, 219, 366/220, 216, 217, 218, 208, 213; 451/326, 330, 328; 99/446, 400, 444

(56) References Cited

U.S. PATENT DOCUMENTS

| | | | |
|---|---|---|---|
| 2,006,451 A | * 7/1935 | Glidden | 366/213 |
| 2,513,352 A | * 7/1950 | O'Meara | 366/217 |
| 3,438,353 A | * 4/1969 | Pellegrini | 366/233 |
| 4,235,553 A | 11/1980 | Gall | 366/208 |
| 4,277,185 A | * 7/1981 | Thompson | 366/213 |
| 4,491,415 A | 1/1985 | Bishop | 366/47 |
| 4,896,968 A | 1/1990 | Baillie | 366/10 |
| 4,919,539 A | 4/1990 | Drocco | 366/94 |
| 4,963,032 A | 10/1990 | Strehlow | 366/57 |
| 5,118,198 A | 6/1992 | Whiteman, Jr. | 366/47 |
| 5,169,231 A | 12/1992 | Suzuki | 366/105 |
| 5,261,744 A | 11/1993 | Brunn | 366/217 |
| 5,383,163 A | 1/1995 | Brunn | 366/217 |
| 5,466,065 A | 11/1995 | Catrombon | 366/209 |
| 5,492,406 A | * 2/1996 | Meyer | 366/233 |
| 5,527,109 A | * 6/1996 | Meyer | 366/219 |
| 5,556,202 A | 9/1996 | Dorn | 366/213 |
| 5,575,559 A | 11/1996 | Roll | 366/171.1 |

FOREIGN PATENT DOCUMENTS

JP 10-99033 4/1998

OTHER PUBLICATIONS

Partial Translation of Patent Laying-Open Publication No. H10-99033, Apr. 21, 1998.

* cited by examiner

Primary Examiner—Tony G. Soohoo
(74) Attorney, Agent, or Firm—Webb Ziesenheim Logsdon Orkin & Hanson, P.C.

(57) ABSTRACT

A food mixing apparatus includes a main housing, a mixing container for receiving food, and having a central axis: Y, a rotor ring surrounding the mixing container, the rotor ring being fixed to the mixing container and having a central axis: X extending at an angle to the central axis: Y of the mixing container, and a support roller mechanism attached to the main housing, the support roller mechanism supporting the rotor ring at two points only from below to rotate the rotor ring about the axis: X. An aerating tube communicating with an opening formed in a bottom surface of the mixing container extends coaxially with the axis: X of the rotor ring. The aerating tube communicates with a blast duct mounted in the main housing.

10 Claims, 13 Drawing Sheets

(a)

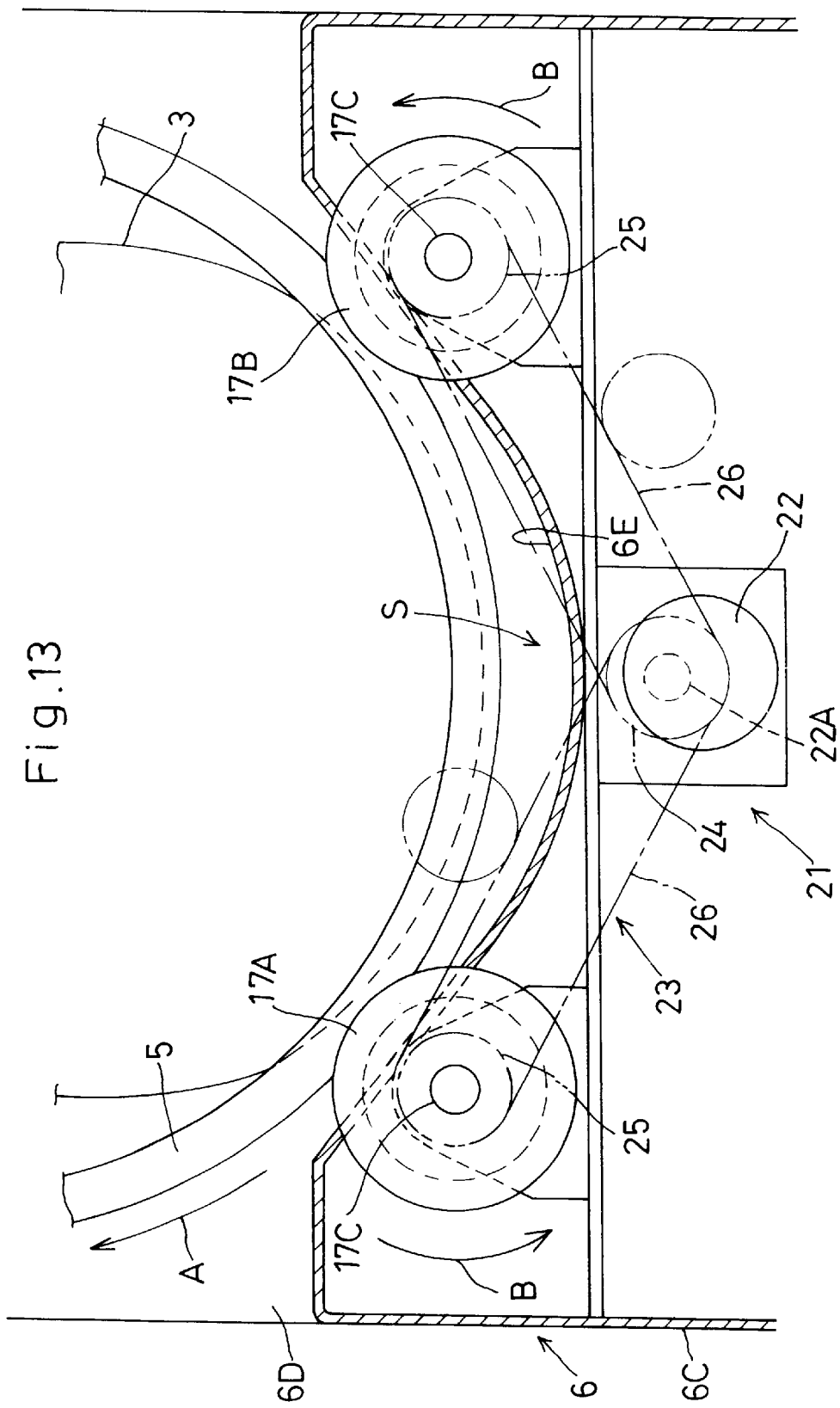

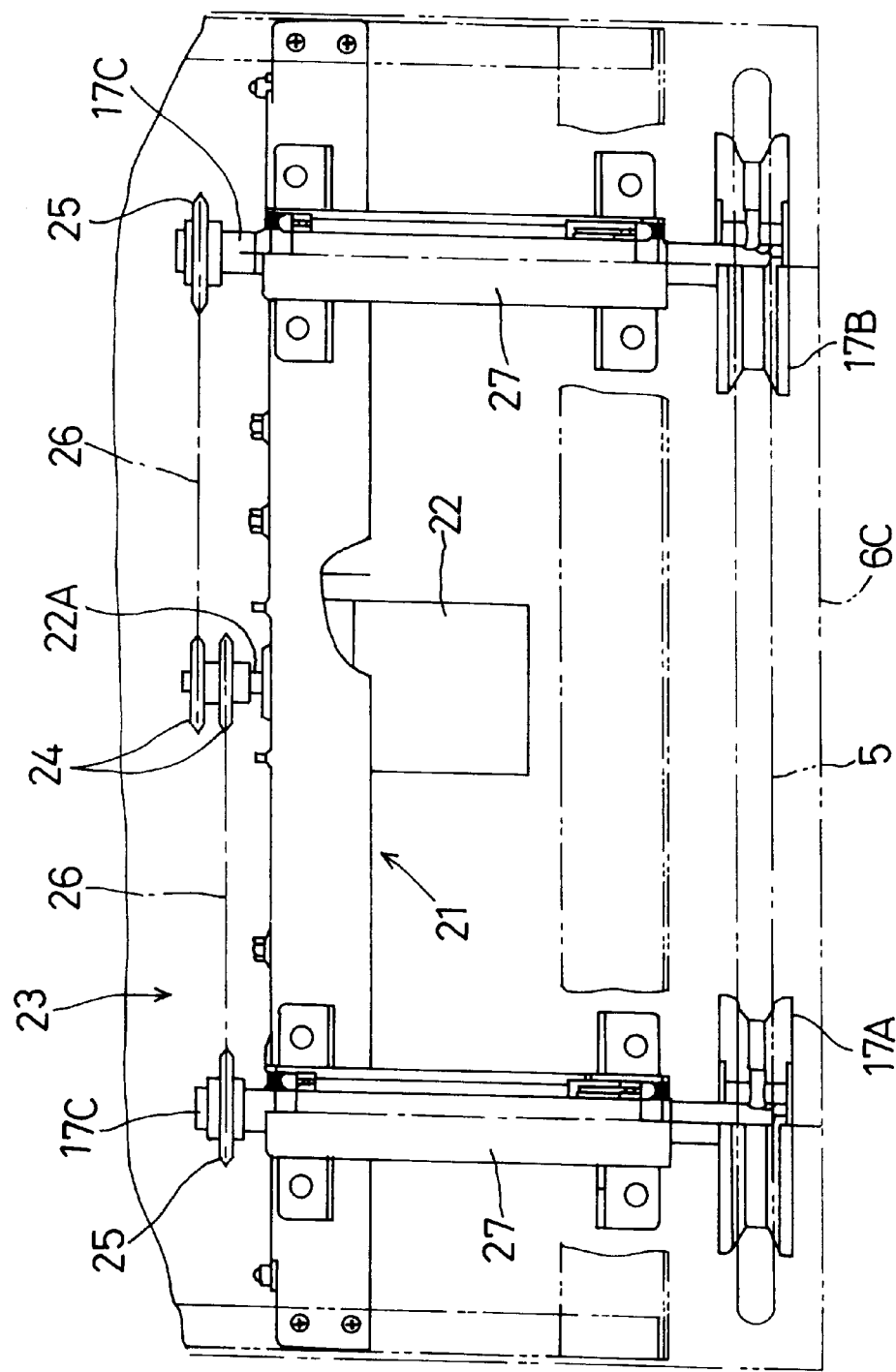

FOOD MIXING APPARATUS

BACKGROUND OF THE INVENTION

1. Field of the Invention

This invention relates to a food mixing apparatus for automatically mixing food placed in a mixing container, such as rice and vinegar, or pasta and sauce.

2. Description of the Related Art

A known food mixing apparatus, as disclosed in Japanese Patent Laying-Open Publication H10-99033, for example, includes a rotary container in the form of a bottomed cylinder for receiving food, a rotor ring connected peripherally of the rotary container and having a fore and aft axis inclined relative to the axis of the rotary container, and a main body for supporting the rotor ring to be rotatable about its axis. The main body of the food mixing apparatus has three support rollers for rotatably supporting the rotor ring at right, left and lower peripheries thereof. The lower support roller is connected to a drive motor to be rotatable by the drive motor. The rotation is transmitted by friction to the rotor ring, thereby to rotate the rotor ring and mixing container.

In the above food mixing apparatus, the mixing container, with its axis inclined relative to the axis of the rotor ring, rotates in a precession, successively directing a front opening thereof obliquely upward, obliquely sideways, obliquely downward and obliquely sideways. As a result, the food in the mixing container is mixed efficiently while being moved up and down and fore and aft.

However, the shifting of the center of gravity occurring with the precession wobbles the mixing container from side to side, to wear the right and left support rollers quickly. When the wear creates large gaps between the rotor ring and right and left support rollers, the rotor ring intermittently and repeatedly contacts (i.e. collides with) the support rollers to produce strong vibration and loud noise. In addition, sliding contact occurs with increased frequency therebetween, which contributes to the wear of the support rollers. Another disadvantage is that slippage and a shortage of friction drive could occur since the mixing container is rotated only by the support roller under the rotor ring.

The entire apparatus has a large width and cannot be formed compact, with the support rollers arranged in the right and left outer positions of the rotor ring. Spilt food, dust and the like may deposit below the mixing container, and the lower surface of the mixing container may become stained. The lower support roller is obstructive to a cleaning operation for removing such deposits and stains.

SUMMARY OF THE INVENTION

The object of this invention is to provide a food mixing apparatus which advantageously checks wear of support rollers and vibration of a mixing container, and which is formed compact, has improved maintainability, and has a reduced drive transmission loss.

A food mixing apparatus according to this invention comprises a main housing, a mixing container for receiving food, and having a central axis: Y, a rotor ring surrounding the mixing container, the rotor ring being fixed to the mixing container and having a central axis: X extending at an angle to the central axis: Y of the mixing container, and a support roller mechanism attached to the main housing, the support roller mechanism supporting the rotor ring at two points only from below to rotate the rotor ring about the axis: X.

With the above construction in which the rotor ring is supported at two points from below, the mixing container is effectively restrained from wobbling when in rotation, with the aid of its own weight. Even when rollers of the support roller mechanism are worn, the rotor ring is pressed against the rollers by gravity to eliminate the possibility of forming gaps between the rollers and rotor ring, thereby preventing vibration and noise. There is little possibility of the support roller mechanism protruding from the width of the rotor ring, which allows the entire apparatus to be compact. With the support roller mechanism contained in the width of the rotor ring, the maximum width of the apparatus may be made as close to the right and left width of the rotor ring as possible.

In a preferred embodiment of this invention, the support roller mechanism includes a first support roller and a second support roller for rotating the rotor ring, the first support roller and the second support roller being arranged in mirror symmetry about a vertical line. With this construction, a lower portion of the rotor ring fits between the first and second support rollers spaced apart transversely of the apparatus. Thus, the rotor ring is rotatably and stably supported by the support roller mechanism. Two support rollers are sufficient according to this composition. The number of support rollers is less than in the prior art, thereby achieving a cost reduction.

Furthermore, a space is formed between the first and second support rollers. This space facilitates removal of dust and the like collected below the mixing container, and cleaning of a lower portion of the mixing container, thereby improving maintainability. The main housing may include a post portion in form of a rectangular parallelepiped, and a table portion having a skirt surface sloping downward from a middle front surface of the post portion, the support roller mechanism having rollers protruding upward from the skirt surface, and the mixing container being disposed above the skirt surface through the rotor ring. Then, dust and the like lodged on the skirt surface may be removed from between the first and second support rollers by utilizing the slope, thereby facilitating a cleaning operation.

The support roller mechanism may include a first support roller and a second support roller for rotating the rotor ring in a predetermined direction of rotation, the first support roller acting as a drive roller and the second support roller acting as a driven roller, the first support roller being disposed forwardly of the second support roller with respect to the predetermined direction of rotation. Then, the drive roller has a driving vector directed upward. This restrains slippage between the drive roller and rotor ring, and avoids transmission loss and wear.

Of course, both support rollers may act as drive rollers. This construction will increase friction transmission to prevent reliably a transmission loss due to slippage.

In a further preferred embodiment of this invention, the mixing container includes a shaft extending outwardly from a bottom surface thereof and coaxially with the axis: X of the rotor ring, the shaft being rotatably supported by the main housing. With this construction, the mixing container is steadily rotatable through the rotor ring. Further, the shaft may be an aerating tube communicating with an opening formed in the bottom surface of the mixing container, the aerating tube communicating with a blast duct mounted in the main housing. Air flows may be supplied to the mixing container in rotation, thereby cooling, heating or flavoring the food to be mixed. In preparing tasty sushi rice, for example, cool air is essential when mixing boiled rice and vinegar.

Other features and advantages of this invention will be apparent from the following description of the embodiments to be taken with reference to the drawings.

BRIEF DESCRIPTION OF THE DRAWINGS

FIG. 13 is a front view of a rotating device of a food mixing apparatus in a second embodiment of this invention.

FIG. 14 is a plan view of the food mixing apparatus shown in FIG. 13.

DESCRIPTION OF THE PREFERRED EMBODIMENTS

An embodiment of this invention will be described hereinafter with reference to the drawings.

Figure 1:
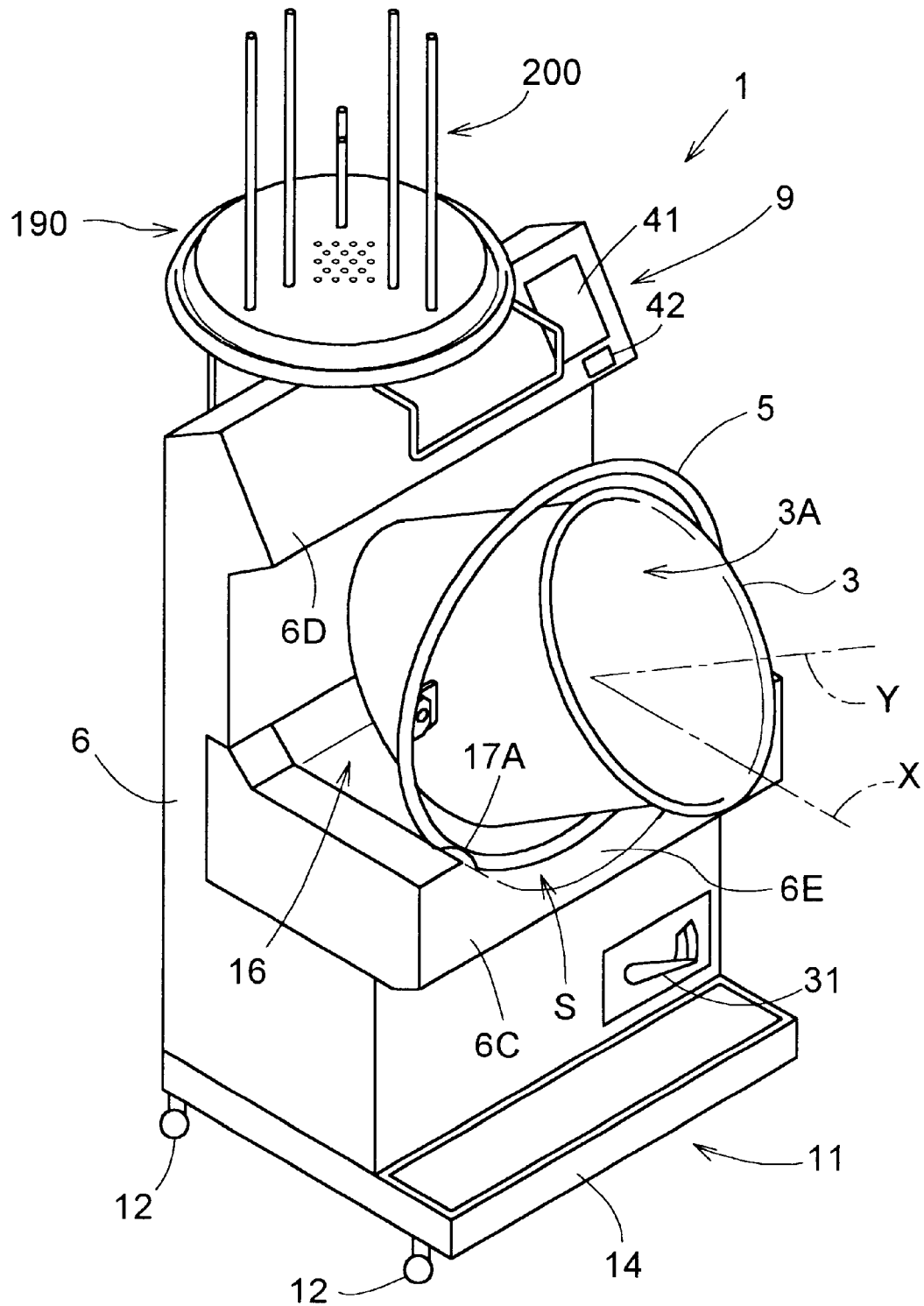
FIG. 1 is a perspective view of a food mixing apparatus according to this invention.
Figure 2:
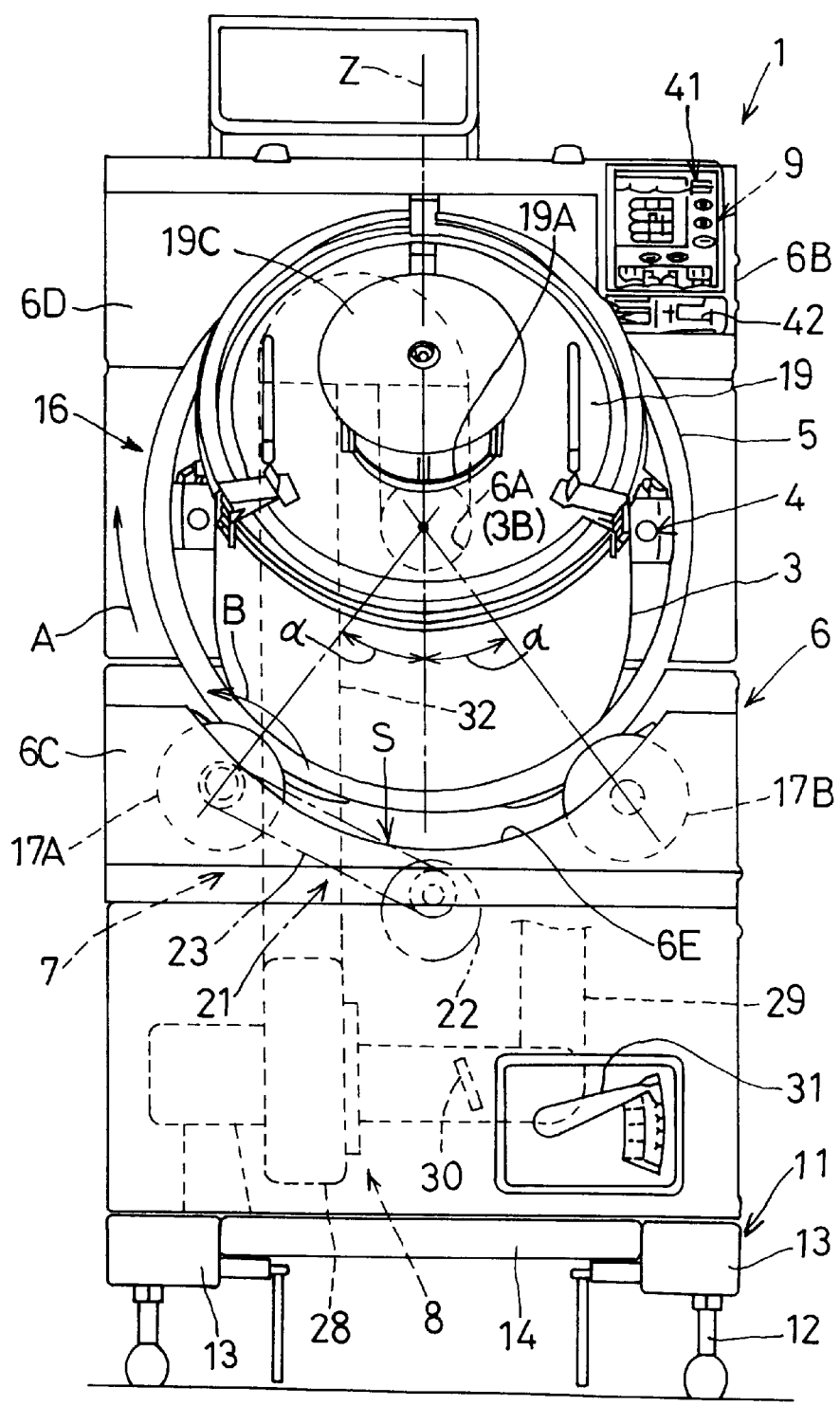
FIG. 2 is a front view of the food mixing apparatus shown in FIG. 1.
Figure 3:
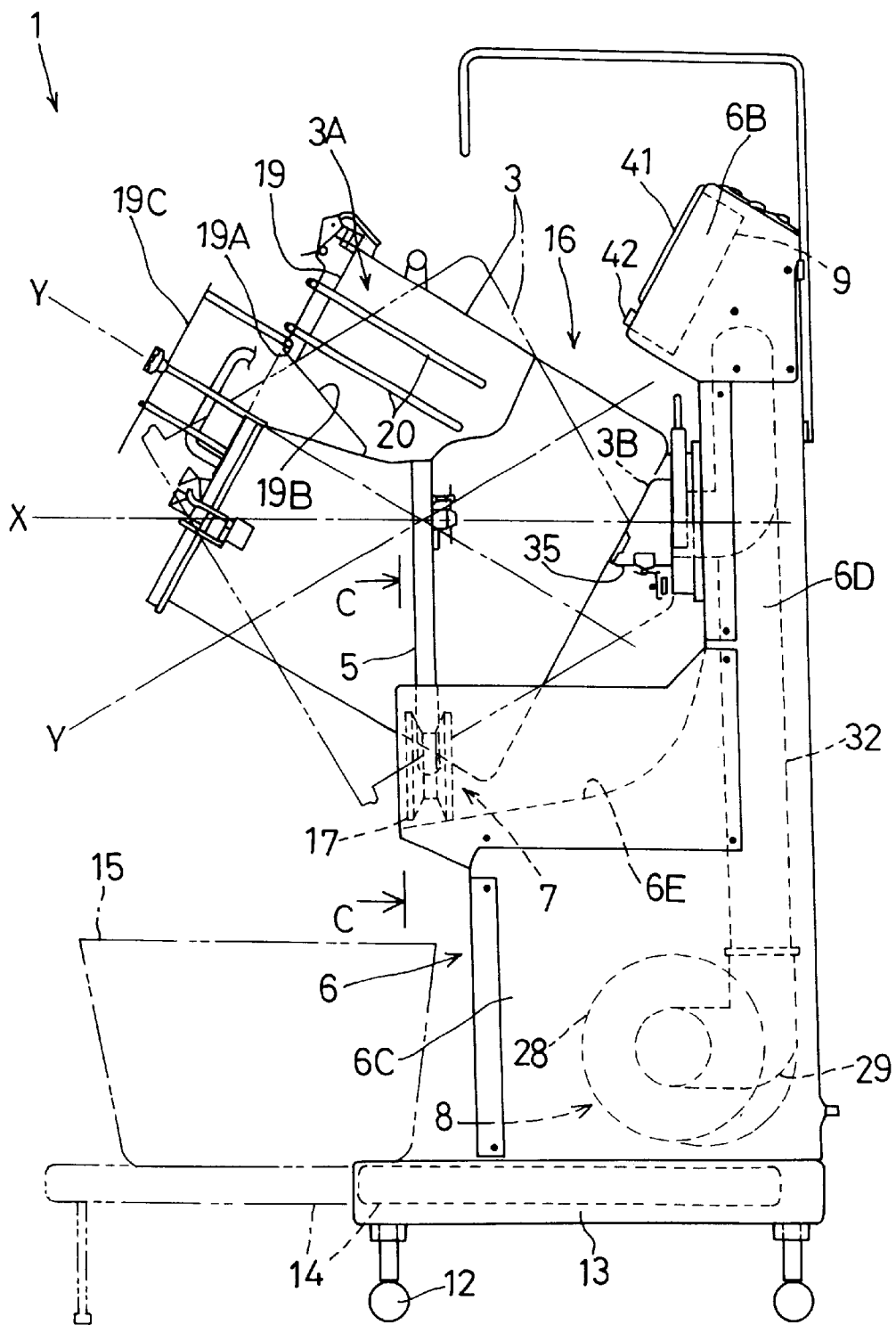
FIG. 3 is a side view of the food mixing apparatus shown in FIG 1.

FIGS. 1 through 3 show a food mixing apparatus 1 according to this invention. This embodiment exemplifies an apparatus used mainly for mixing boiled rice and vinegar to prepare vinegared rice (i.e. sushi rice). The food mixing apparatus 1 includes a mixing container 3 for receiving food such as cooked rice and vinegar and rotatable to mix the food therein, a rotor ring 5 detachably attached to peripheries of the container 3 through couplings 4. The rotor ring 5 has an axis X thereof extending substantially horizontally (in a fore and aft direction; forwardly of the apparatus 1). The apparatus 1 further includes a main housing 6 for supporting the mixing container 3 through the rotor ring 5 to be rotatable about the axis X.

In this specification, the fore and aft direction refers to a direction along the axis X of rotation of the rotor ring 5 and mixing container 3 as noted above, and the transverse direction is perpendicular to the axis X. The main housing 6 has a rotating device 7 for transmitting torque to the mixing container 3 through the rotor ring 5, and an aerating device 8 for forcibly sending air flows into the mixing container 3 for circulation therein.

The rotating device 7 and aerating device 8 are operable under control of a controller 9 for successively and automatically carrying out a "mixing step", a "steaming step" and a "cooling step". In the "mixing step", the mixing container 3 is rotated continuously to mix and stir the food therein. In the "steaming step" the container 3 is stopped (or rotated intermittently) for a predetermined time after the mixing step. In the "cooling step" the food is cooled by the aerating device 8 while rotating the mixing container 3 continuously or intermittently.

The main housing 6 is in the form of a hollow box having a base 11 disposed at the bottom thereof. The base 11 has adjuster legs 12 attached to a lower surface thereof. With these adjuster legs 12, the main housing 6 is adjusted and fixed to a horizontal posture. Wheels and casters may be attached to the lower surface of base 11 to move the apparatus 1.

The base 11 includes right and left frames 13 opposed to each other, and a support table 14 disposed between the right and left frames 13. The support table 14 may be drawn forward from the position between the right and left frames 13.

A receiving container 15 may be placed on the support table 14 drawn forward under the mixing container 3 to transfer vinegared rice from the mixing container 3 to the receiving container 15.

When the receiving container 15 is removed from the support table 14, the support table 14, may be retracted to the position between the base frames 13 to be out of contact with the operator's feet and the like. In this way, a small kitchen space may be used effectively. With the support table 14 retracted, the apparatus 1 may be installed or moved with ease.

The main housing 6 is shaped rectangular in front view and, when viewed from a side, has increased fore and aft dimensions with a lower half (i.e. a lower structure 6C) protruding forward from an upper half (i.e. an upper structure 6D). Thus, a recess 16 is formed above the lower structure 6C and forwardly of the upper structure 6D.

The mixing container 3 is in the form of a bottomed cylinder, with the bottom thereof accommodated in the recess 16.

The mixing container 3 is connected in longitudinally intermediate positions thereof to the rotor ring 5 through the couplings 4. The container 3 has an axis (i.e. cylinder axis) Y extending at an angle to the axis (i.e. axis of rotation) X of rotor ring 5. The container 3 defines an opening 3A disposed forwardly along the container axis Y.

A lid 19 is detachably attached to the opening 3A of mixing container 3. The lid 19 has a plurality of stirring elements 20 projecting from an inner surface thereof.

The lower structure 6C supports a first and a second support rollers 17A and 17B arranged at opposite, right and left sides of an upper front region thereof to be rotatable about fore and aft axes. These support rollers 17A and 17B constitute a support roller mechanism.

The first and second support rollers 17A and 17B are spaced from each other within a range substantially fitting in a right and left width of rotor ring 5. The support rollers 17A and 17B provide a two-point support in the lower right and left positions of rotor ring 5 for supporting the weight of rotor ring 5 and mixing container 3, and guide rotation of rotor ring 5 about the fore and aft axis X.

In this embodiment, the first support roller 17A (at the left side in FIG. 2) is a drive roller acting as the rotating device 7. The rotor ring 5 and mixing container 3 are rotatable in a direction of arrow A through friction transmission by rotation of drive roller 17A in a direction of arrow B. The second support roller 17B is a driven roller rotatable with rotation of the rotor ring 5.

As noted above, the first and second support rollers 17A and 17B provide a two-point support in the lower right and left positions of rotor ring 5. The lower end region of rotor ring 5 is fitted between the first and second support rollers 17A and 17B, whereby the rotor ring 5 and mixing container 3 are restrained from moving sideways.

Further, by arranging the first and second support rollers 17A and 17B within the right and left width of rotor ring 5, the entire apparatus 1 is formed compact with a minimal right and left width.

In the illustrated example, a vertical line Z passing through the axis of rotation X forms equal angles (with right and left line segments between the axis of rotation X and the respective axes of support rollers 17A and 17B). Instead, the support rollers 17A and 17B may be arranged to make these angles unequal (in which case, the first and second support rollers 17A and 17B are vertically displaced relative to each other).

Figure 4:
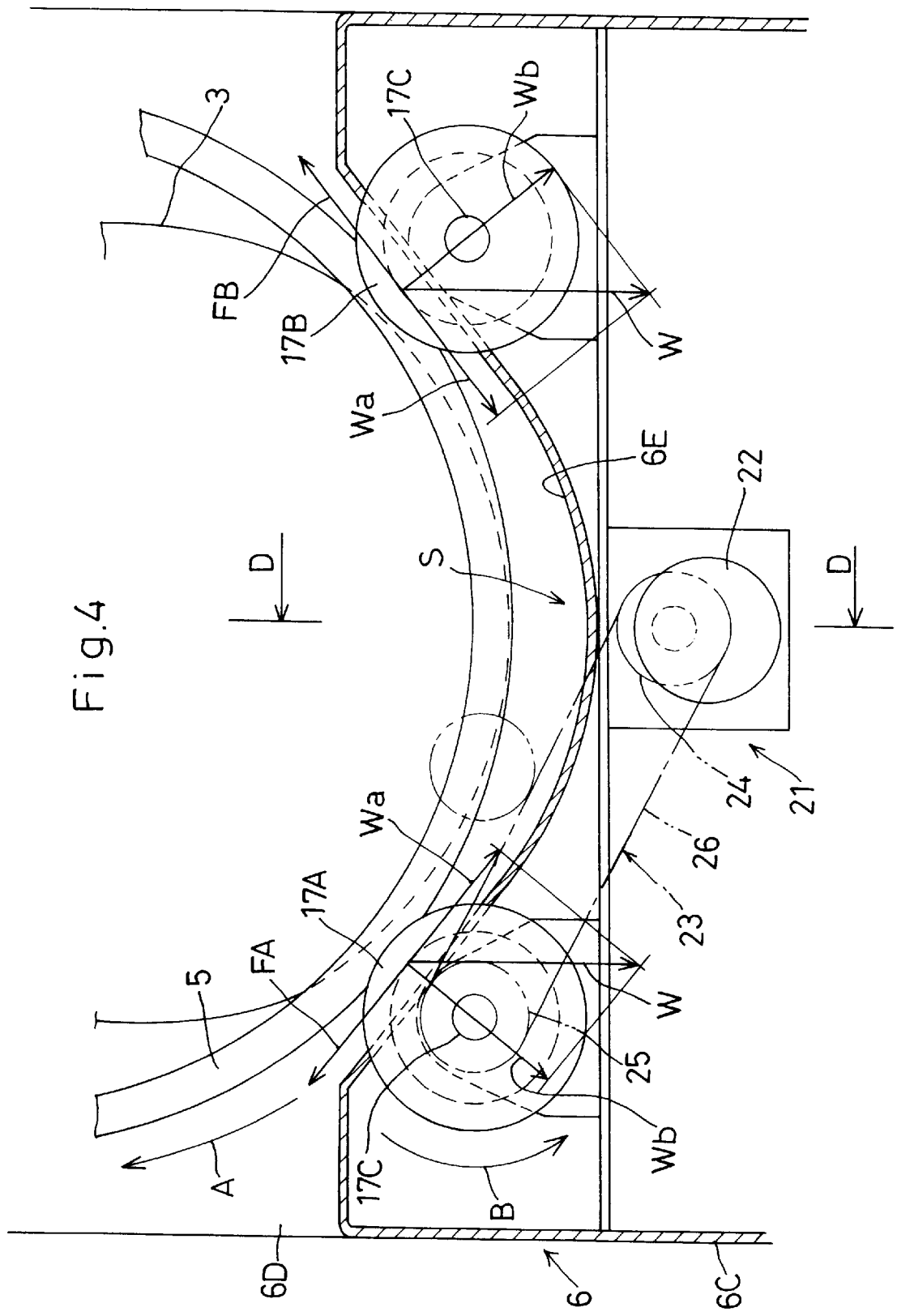
FIG. 4 is a section taken on line C—C of FIG. 3.
Figure 5:
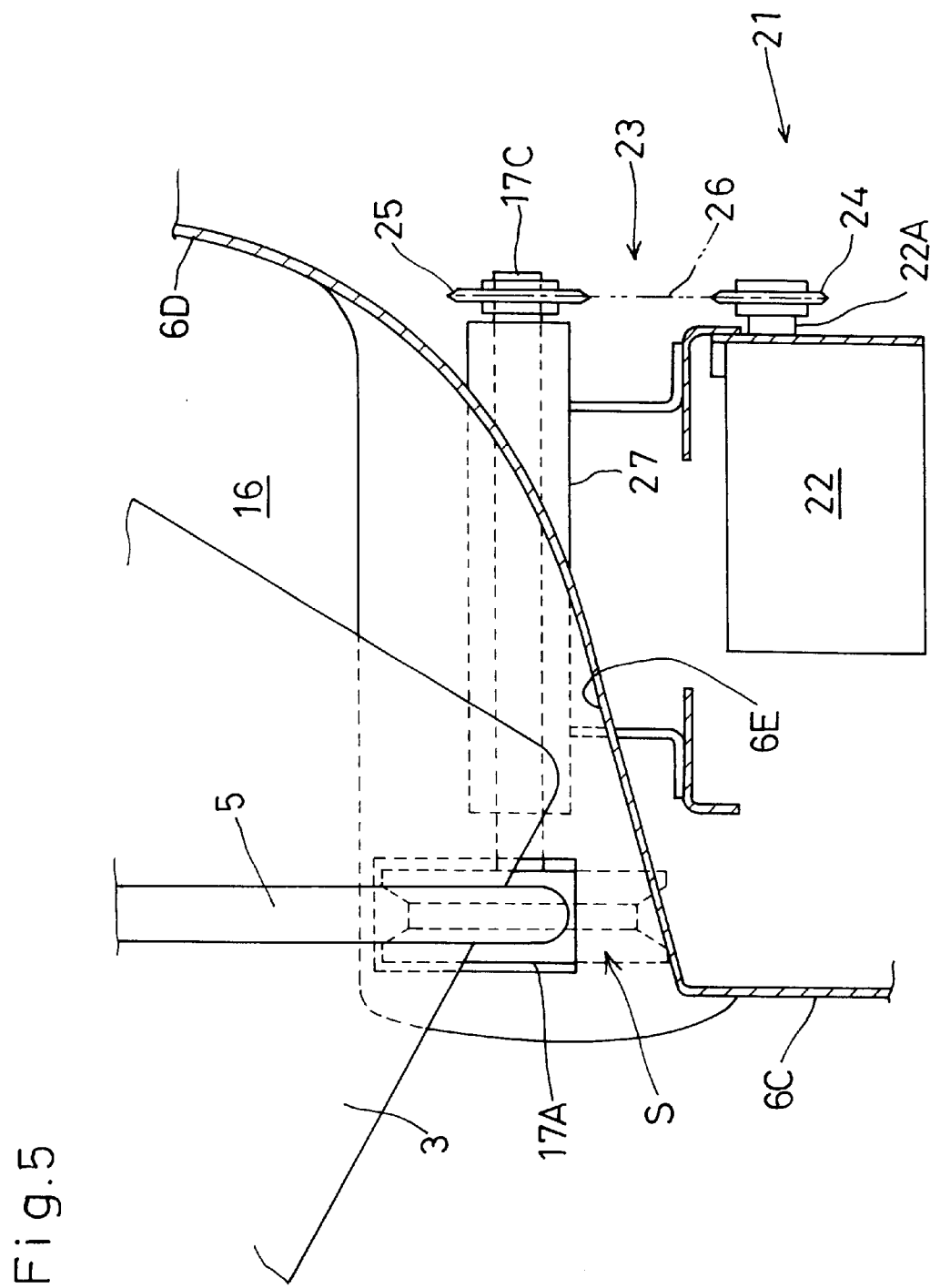
FIG. 5 is a section taken on line D—D of FIG. 4.
Figure 6:
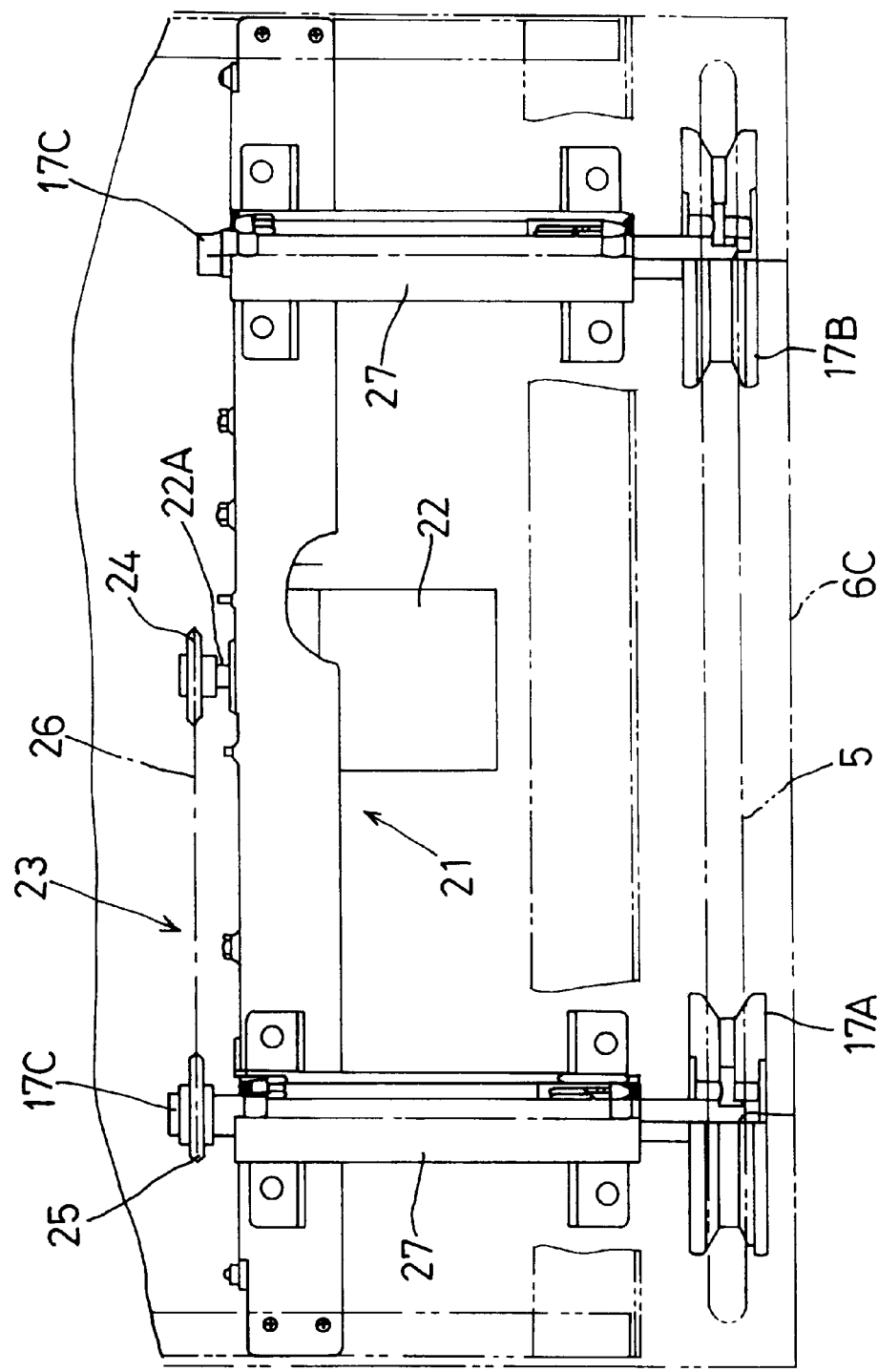
FIG. 6 is a plan view of a rotating device.

As shown in FIGS. 4 through 6 also, the rotating device 7 has a transmission mechanism 21 for applying torque to the support roller 17A acting as a drive roller. The transmission mechanism 21 includes a drive motor 22 disposed substantially in a transversely middle position of main housing 6 under the bottom of mixing container 3, and a transmission member 23 for transmitting power of drive motor 22 to the support roller 17A.

The support rollers 17A and 17B have rotary shafts 17C extending rearward into support sleeves 27 fixed in the main housing 6 and extending in the fore and aft direction, respectively. The rotary shafts 17C are rotatably supported through bearings in the support sleeves 27. The transmission member 23 includes a drive sprocket 24 coupled to an output shaft 22A projecting rearward from the drive motor 22, a driven sprocket 25 coupled to the rear end of the rotary shaft 17C of the first support roller 17A acting as the drive roller, and a transmission chain 26 extending between and wound around the drive sprocket 24 and driven sprocket 25.

By operating the drive motor 22, the rotary shaft 17C and support roller 17A are rotated through the drive sprocket 24, transmission chain 26 and driven sprocket 25. Then, the rotor ring 5 is rotated by friction transmission about the axis (fore and aft axis) X. The mixing container 3 connected to the rotor ring 5 also is rotated about the same axis X.

At this time, the mixing container 3, with the container axis Y inclined relative to the axis of rotation X, rotates in the direction of arrow A in FIGS. 2 and 4, successively directing the opening 3A obliquely upward, obliquely sideways, obliquely downward and obliquely sideways. In rotating in this manner, the mixing container 3 makes a precession moving the food inside back and forth as well as up and down and right and left, thereby to mix the food efficiently.

With the precession and with the movement of the food, the center of gravity of the mixing container 3 shifts up and down and right and left. However, the mixing container 3 is effectively restrained from wobbling right and left by the first and second support rollers 17A and 17B restricting transverse movements of the rotor ring 5. Even when the first and second support rollers 17A, and 17B are worn, the weight of mixing container 3 presses the rotor ring 5 against the first and second support rollers 17A and 17B. No gap or backlash is produced between the rotor ring 5 and the first and second support rollers 17A and 17B to prevent vibration and noise.

In this embodiment, the first support roller 17A disposed forwardly in the direction of rotation A of the container 3 acts as the drive roller. It is possible for the second support roller 17B disposed rearwardly in the direction of rotation A to act as the drive roller. In this case, the rotor ring 5 under its own weight W (including the weight of mixing container 3) contacts the second support roller 17B, and receives from the second support roller 17B a reaction force FB to a tangential component Wa of weight W. This reaction force FB acts in a direction counter to the direction of rotation A of the rotor ring 5, thus offering a resistance to the rotation of rotor ring 5. This tends to cause slips between the rotor ring 5 and second support roller 17B.

Conversely, where, as in this embodiment, the first support roller 17A disposed forward in the direction of rotation A acts as the drive roller, a tangential reaction force FA acts in the direction of rotation A to assist in the rotation of rotor ring 5. This diminishes the chance of slippage occurring between the rotor ring 5 and second support roller 17B to reduce wear and transmission loss.

The transmission mechanism 21 is disposed below the bottom of mixing container 3 and rearwardly spaced from between the first and second support rollers 17A and 17B (the drive motor 22 being spaced rearward and downward). This arrangement leaves a large transverse space S between the first and second support rollers 17A and 17B.

The main housing 6 includes a skirt portion 6E (upper portion of lower structure 6C) having an upper skirt surface defining the recess 16. This upper skirt surface, in front view, is recessed (bowl-shaped) with high right and left sides where the first and second support rollers 17A and 17B are attached, and a low transversely middle region. Further, the transversely middle region is sloped forward and downward in side view.

With the above construction, deposits of dust and the like formed below the mixing container 3 (i.e. on the skirt surface of skirt portion 6E) may be removed and the lower surface of container 3 may be cleaned easily through the space S, to achieve improved maintainability. The forwardly sloping skirt portion 6E promotes removal of dust and other deposits to further facilitate cleaning and the like.

With the skirt portion 6E recessed in front view, dust and other deposits tend to collect in the transversely middle space S between the first and second support rollers 17A and 17B to further facilitate cleaning. The skirt portion 6E elevated toward the rear end thereof allows a large space to be formed thereunder for accommodating the transmission mechanism 21.

The aerating device 8 includes a blower 28 disposed in a lower position of the main housing 6. An intake duct 29 is connected to a suction port of blower 28. The intake duct 29 extends upward in the main housing 6 to an intake opening formed in an upper position of main housing 6 to draw in ambient air.

A control lever 31 is attached to a lower front position of main housing 6 for controlling a switch valve 30 mounted in the intake duct 29. The switch valve 30 is operable to vary a flow area in the intake duct 29, thereby to adjust the suction or blowing strength of blower 28.

Figure 7:
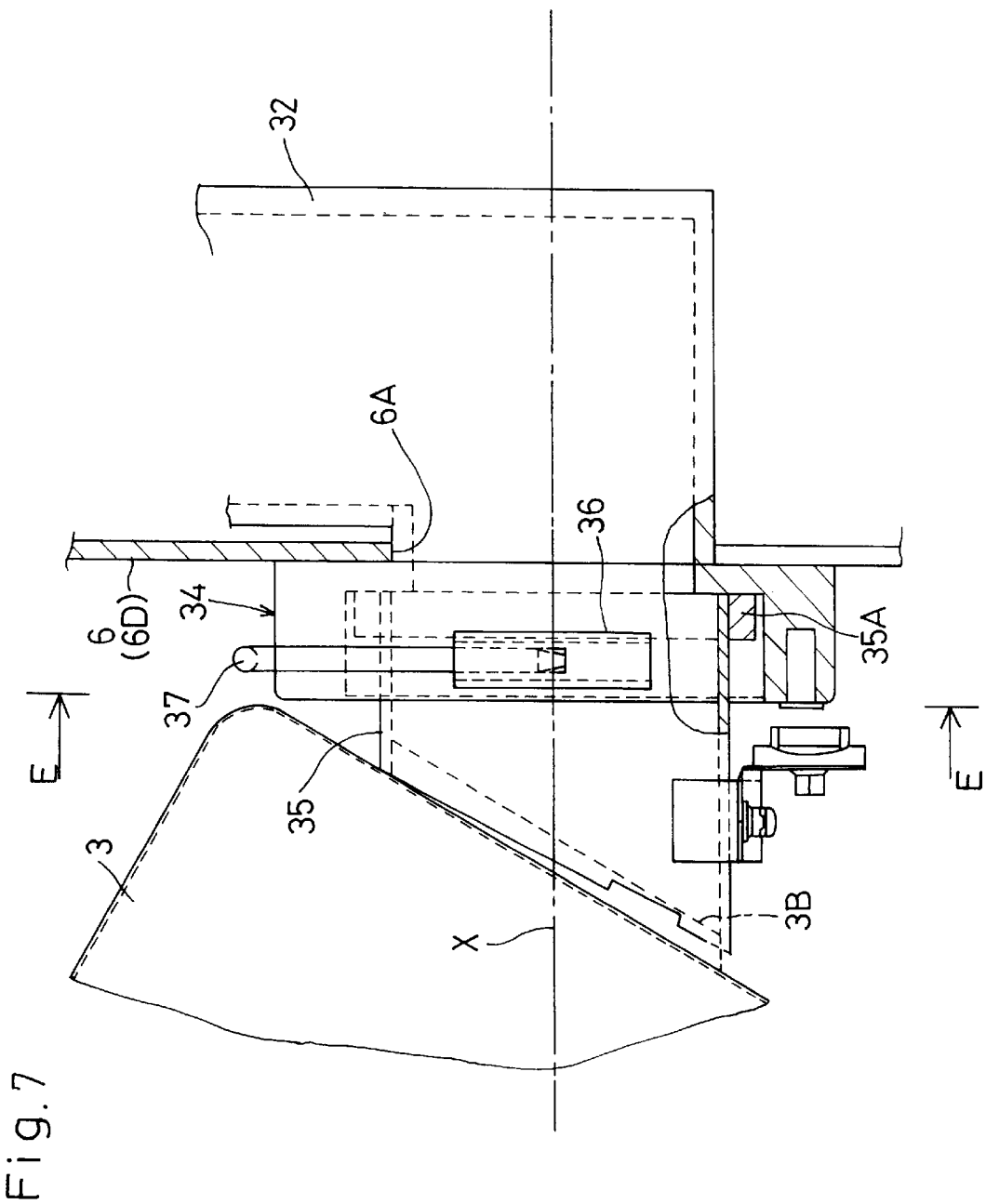
FIG. 7 is an enlarged side view showing the bottom of a mixing container.

A blast duct 32 is connected to a discharge port of blower 28. The blast duct 32 extends upward and is bent at the upper end to extend downward. As shown in FIG. 7, the terminal end of blast duct 32 is connected to an opening 6A formed in the front surface of main housing 6 coaxially with the axis of rotation X. An annular receiving member 34 having a larger diameter than the blast duct 32 projects forward from the opening 6A.

The mixing container 3 has an aerating opening 3B formed in the bottom thereof to be coaxial with the axis of rotation X, and an aerating tube 35 projecting rearward from the opening 3B. The rear end of aerating tube 35 is inserted into the receiving member 34.

The lid 19 attached to the mixing container 3 has an air release opening 19A formed centrally thereof. A leak preventing member 19B formed of a porous material is removably mounted in the opening 19A to protrude into the mixing container 3. A deflector 19C is disposed forwardly of the release opening 19A.

Thus, air flows produced by the blower 28 may enter the mixing container 3 through the blast duct 32 and aerating tube 35. The incoming air flows circulate in the mixing container 3 to cool the food therein, and exit the release opening 19A through the leak preventing member 19B. The exiting air flows are deflected by the deflector 19C to avoid blowing frontally against the operator.

Figure 8:
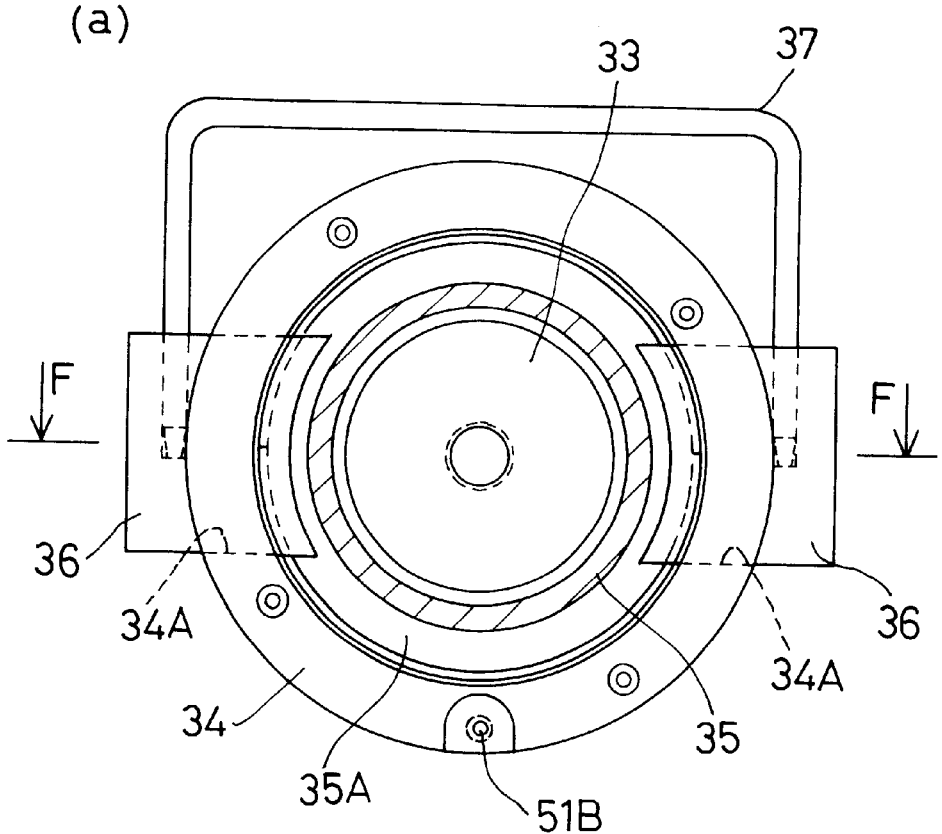
FIG. 8 is a section taken on line E—E of FIG. 7.
Figure 9:
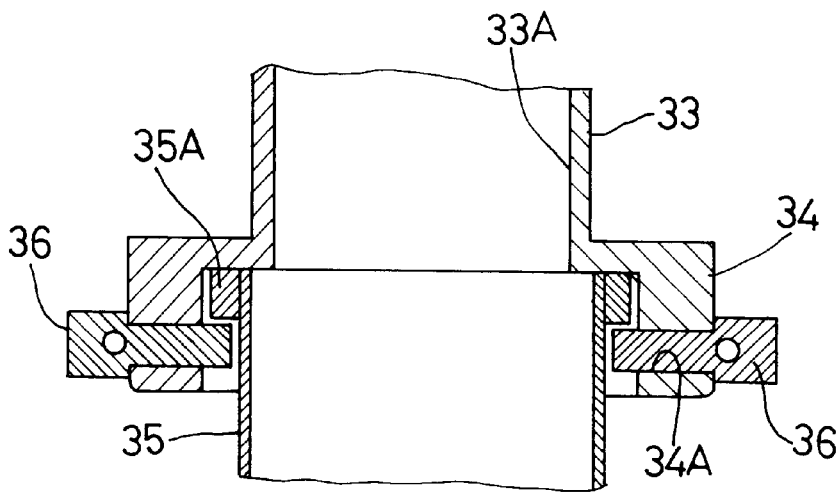
FIG. 9 is a section taken on line F—F of FIG. 8.

As shown in FIGS. 7 and 8, the aerating tube 35 has a flange 35A projecting radially from a rear end thereof. The receiving member 34 has right and left side walls perforated to form rectangular bores 34A, and retainer plates 36 removably inserted into the bores 34A. The retainer plates 36 have right and left inward ends projecting inwardly through the walls of receiving member 34 to engage front surfaces of flange 35A. As a result, the aerating tube 35 is retained in the receiving member 34, and the mixing container 3 is prevented from tilting forward. With the aerating tube 35 inserted into the receiving member 34, the bottom of mixing container 3 is restrained from moving up and down.

The mixing container 3 (and rotor ring 5) is restrained in intermediate positions in the fore and aft direction by the first and second support rollers 17A and 17B from moving transversely, and at the bottom by the receiving member 34 from moving fore and aft and up and down. In this way, the mixing container 3 is maintained in proper posture although supported at two points by the first and second support rollers 17A and 17B to realize a small right and left width. An arch-shaped lock member 37 is detachably attached at opposite ends thereof to the retainer plates 36 to prevent the retainer plates 36 from becoming disengaged from the bores 34A.

The main housing 6 has a forward projection 6B formed in an upper right position (upper right position in FIG. 2) on the front surface thereof. The projection 6B contains a control box including a controller 9. A control panel 41 and a power switch 42 are arranged on the front surface of projection 6B.

This control panel 41 has a panel surface thereof facing obliquely upward, or specifically, facing in a direction substantially parallel to the axis Y of mixing container 3 with the opening 3A directed obliquely upward. This orientation provides an excellent forward visibility of control panel 41 and facilitates operation of buttons on the control panel 41.

Visibility and operability are improved also by arranging the control panel 41 above and to the right of mixture container 3 and to project forward from the upper position of main housing 6.

Figure 10:
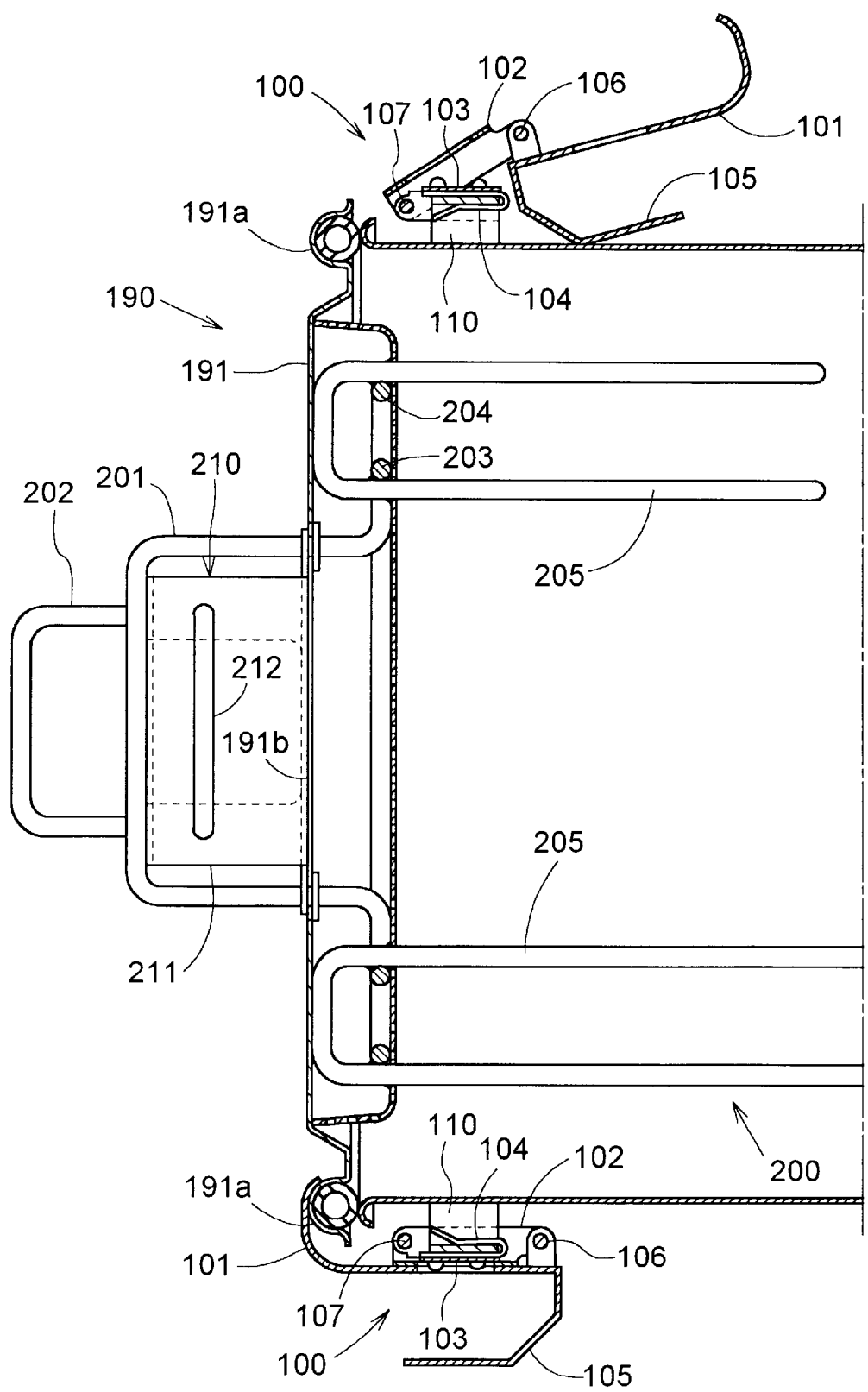
FIG. 10 is a sectional view of a modified lid.
Figure 11:
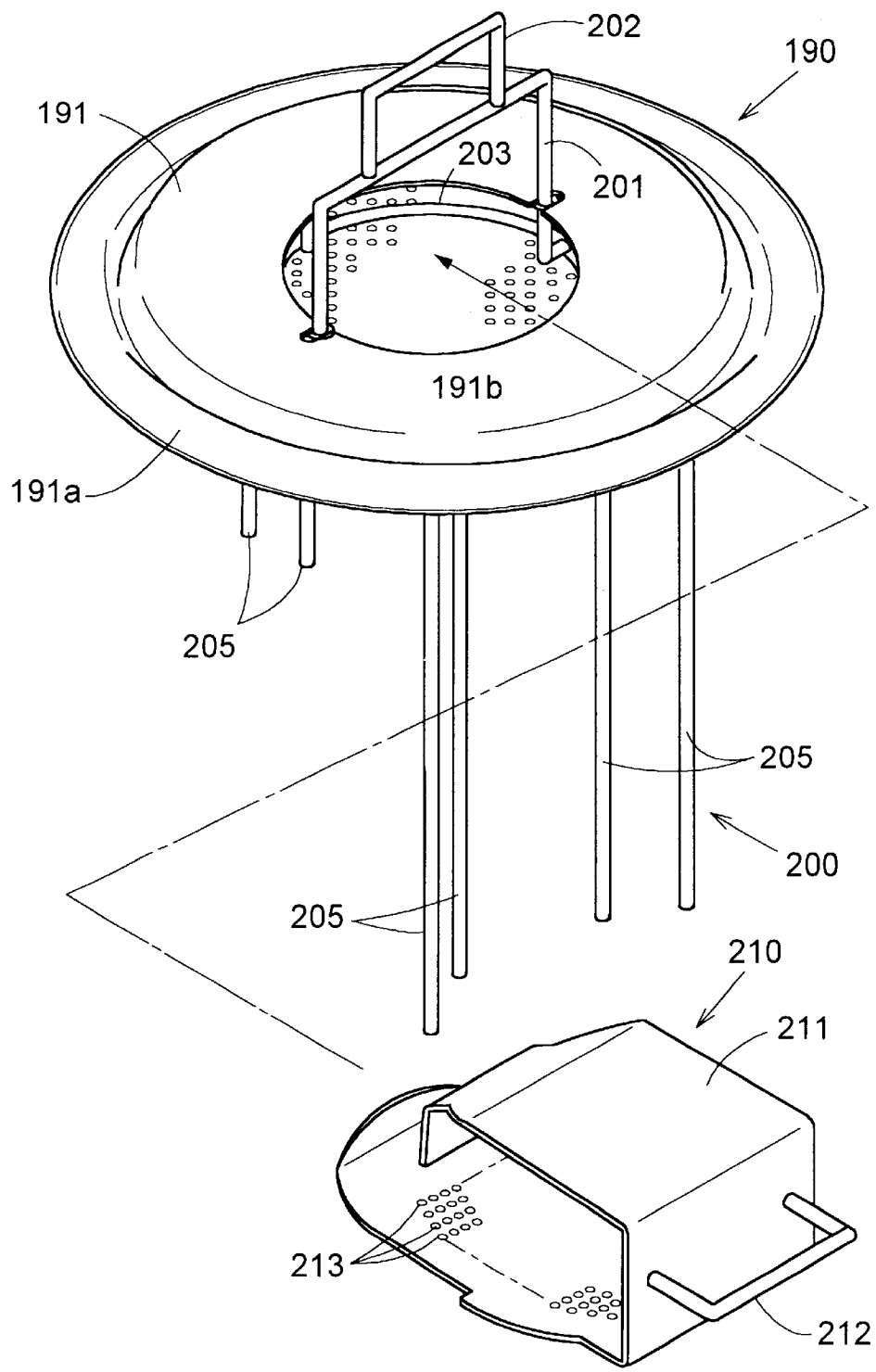
FIG. 11 is a perspective view of the lid shown in FIG. 10.
Figure 12:
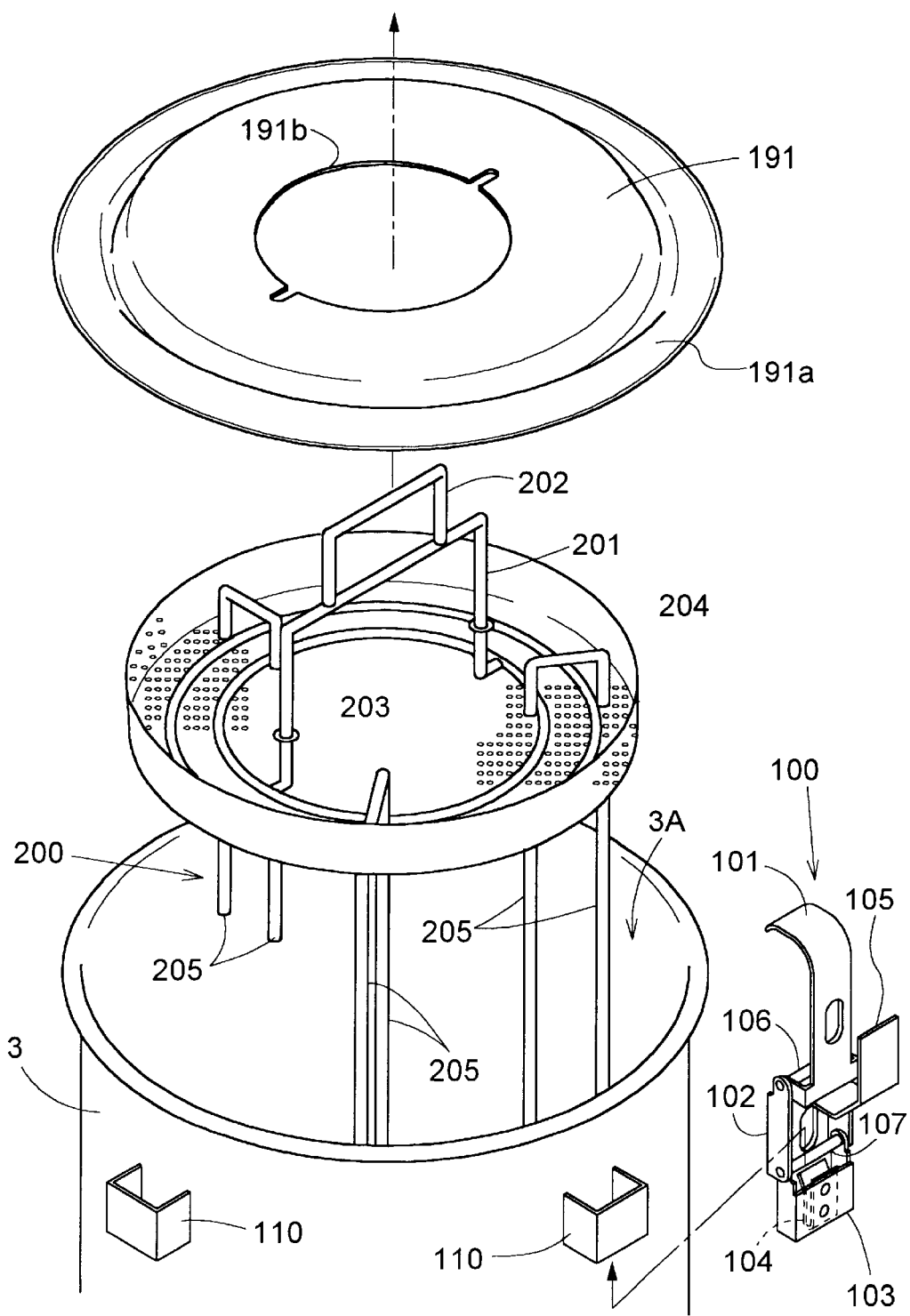
FIG. 12 is a perspective view showing a detached state of a clamp device shown in FIG. 10.

FIGS. 10 and 11 show a lid and a stirring member in a modified form, which includes a clamping device for securing the lid to the mixing container 3. The stirring member 200 is constructed to be readily detachable from the lid 190. As shown in FIG. 12, the clamping device 100 also is constructed to be readily detachable from both lid 190 and mixing container 3 when in a release state. With the stirring member 200 and clamping device 100 detached, the lid 190 and mixing container 3 may be washed easily.

The lid 190 is formed of a lid member 191 defining a ridge 191a of arched section extending circumferentially thereof, and a perforation 191b formed in the center. The lid 190 is sized precisely to close the opening 3A of mixing container 3.

The stirring member 200 includes a support element 201 of approximately inverted U-shape, a grip 202 formed on an upper portion of support element 201, a first ring 203 and a second ring 204 arranged concentrically and connected directly or indirectly to opposite ends of support element 201, and U-shaped stirring rods 205 suspended from the first and the second rings 203 and 204. All these components are formed of barstock. When the support element 201 is inserted from below through the perforation 191b of lid member 191, a rectangular opening is formed by the lid member 191 and support element 201. A lock member 210 is inserted into the rectangular opening to fix the stirring member 200 to the lid 190. After pulling out the lock member 210, the stirring member 200 may be separated from the lid 190. The lock member 210 is in the form of a channel member 211 made by bending a plate into a rectangular sectional shape. With opposite ends defining a predetermined gap therebetween, the channel member 211 exhibits certain elasticity against an external force. Thus, the channel member 211 provides an elastic joint when inserted between the support member 201 and lid member 191. The channel member 211 has a bottom wall defining numerous air holes 213. When the channel member 211 is inserted between the support member 201 and lid member 191, the perforation 191b of lid member 191 communicates with the interior space of mixing container 3 through these air holes 213. A grip 212 is fixed to a side wall of channel member 211.

The clamping device 100 has a three-link structure, and includes a first link 101 having a hook for engaging the ridge 191a of lid member 191, a third link 103 having a hook 104 for engaging an engageable member 110 of mixing container 3, and a second link 102 for pivotally interconnecting the first link 101 and third link 103 through pivot pins 106 and 107. The first link 101 has a knob 105 welded thereto.

The clamping device 100 assumes a clamping state when the hook 104 is engaged with the engageable member 110 of mixing container 3, the hook of the first link 101 is engaged with the ridge 191a of lid member 191, and the knob 105 is manipulated to fold the three links. In this state, the mixing container 3 and lid 190 are fastened together. When the knob 105 is manipulated to spread the three links, the clamping device 100 assumes a release state to be detachable from the mixing container 3 and lid 190.

FIGS. 13 and 14 show a second embodiment of this invention.

In this embodiment, both the first and second support rollers 17A and 17B act as drive rollers. Specifically, two drive sprockets 24 are connected to the output shaft 22A of drive motor 22, and driven sprockets 25 are connected to the rotary shafts 17C of the first and second support rollers 17A and 17B, respectively. Transmission chains 26 are wound around corresponding pairs of drive sprockets 24 and driven sprockets 25.

Since the first and second support rollers 17A and 17B are driven in this embodiment, friction transmission to the rotor ring 5 is increased to avoid slippage.

In this embodiment, the first and second support rollers 17A and 17B may be driven by separate drive motors. However, a simplified construction and reduced cost are achieved by driving the two rollers 17A and 17B with the same drive motor 22 as noted above. Besides, the two rollers 17A and 17B are reliably rotated in synchronism, to avoid slippage with the rotor ring 5 due to a difference in rotating speed between the two rollers 17A and 17B. The drive motor 22 is disposed substantially in a transversely middle position of the apparatus 1, so that the rotary shafts 17C are at substantially the same distance from the output shaft 22A of motor 22 (that is, the right and left transmission chains 26 have the same length). This arrangement effectively avoids unequal rotating speeds of the first and second support rollers 17A and 17B occurring due to stretching of the transmission chains 26, for example.

This invention is not limited to the foregoing embodiments but may be modified as appropriate.

For example, drive motors 22 for applying drive to the first and second support rollers 17A and 17B may be connected directly to the rotary shafts 17C of the first and second rollers 17A and 17B without using the transmission members 23. In this case, the drive motors 22 may be arranged in right and left positions inside the housing 6 to leave a space S between the first and second support rollers 17A and 17B.

The transmission members 23 are formed of the chain transmission mechanisms, but may be belt transmission mechanisms having pulleys and transmission belts.

In each of the above embodiments, one or both of the support rollers 17A and 17B act(s) as drive roller(s). These support rollers 17A and 17B may be adapted to have functions only to support and guide the rotor ring 5. In this case, a different rotating device that acts on the bottom of mixing container 3, for example, may rotate the mixing container 3.

The food mixing apparatus according to this invention may be used not only to mix boiled rice and vinegar, but also to mix, cool or heat boiled rice mixed with assorted materials, spaghetti, potatoes, macaroni, salads and so on. As operating patterns of the apparatus, not only rice may be mixed and cooled or heated at the same time, but also other foodstuffs may be mixed, cooled or heated at a time.

The food mixing apparatus of this invention may have a vinegar supplying apparatus 2 disposed next thereto for automatically supplying vinegar.

What is claim is:

1. A food mixing apparatus comprising:

a main housing;

a mixing container for receiving food, and having a central axis: Y;

a rotor ring surrounding said mixing container, said rotor ring being fixed to said mixing container and having a central axis: X extending at an angle to said central axis: Y of said mixing container; and a support roller mechanism attached to said main housing, said support roller mechanism supporting said rotor ring at two points only from below to rotate said rotor ring about said axis: X.

2. A food mixing apparatus as defined in claim 1, wherein said support roller mechanism includes a first support roller and a second support roller for rotating said rotor ring, said first support roller and said second support roller acting as drive rollers.

3. A food mixing apparatus as defined in claim 2, wherein said first support roller and said second support roller are arranged in mirror symmetry about a vertical line.

4. A food mixing apparatus as defined in claim 1, wherein said support roller mechanism includes a first support roller and a second support roller for rotating said rotor ring in a predetermined direction of rotation, said first support roller acting as a drive roller and said second support roller acting as a driven roller, said first support roller being disposed forwardly of said second support roller with respect to said predetermined direction of rotation.

5. A food mixing apparatus as defined in claim 4, wherein said first support roller and said second support roller are arranged in mirror symmetry about a vertical line.

6. A food mixing apparatus as defined in claim 1, wherein said main housing includes a post portion in form of a rectangular parallelepiped, and a table portion having a skirt surface sloping downward from a middle front surface of said post portion, said support roller mechanism having rollers protruding upward from said skirt surface, and said mixing container being disposed above said skirt surface through said rotor ring.

7. A food mixing apparatus as defined in claim 1, wherein said mixing container includes a shaft extending outwardly from a bottom surface thereof and coaxially with said axis: X of said rotor ring, said shaft being rotatably supported by said main housing.

8. A food mixing apparatus as defined in claim 7, wherein said shaft comprises an aerating tube communicating with an opening formed in said bottom surface of said mixing container, said aerating tube communicating with a blast duct mounted in said main housing.

9. A food mixing apparatus as defined in claim 1, wherein said mixing container has a lid detachably attached thereto by clamp means, said lid having stirring elements detachably attached thereto.

10. A food mixing apparatus as defined in claim 9, wherein said clamping means, when in non-clamping state, being detachable from said mixing container and said lid.

* * * * *